May 26, 1925.
A. L. CHRISTIANSEN
1,539,300
FISH CUTTING AND CLEANING MACHINE
Filed May 14, 1924
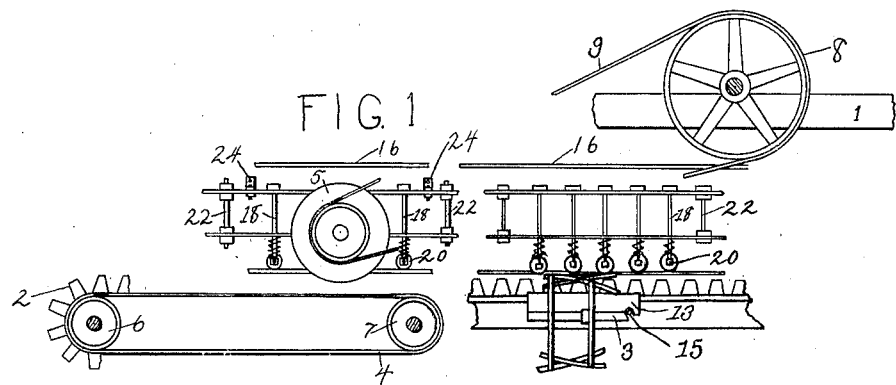
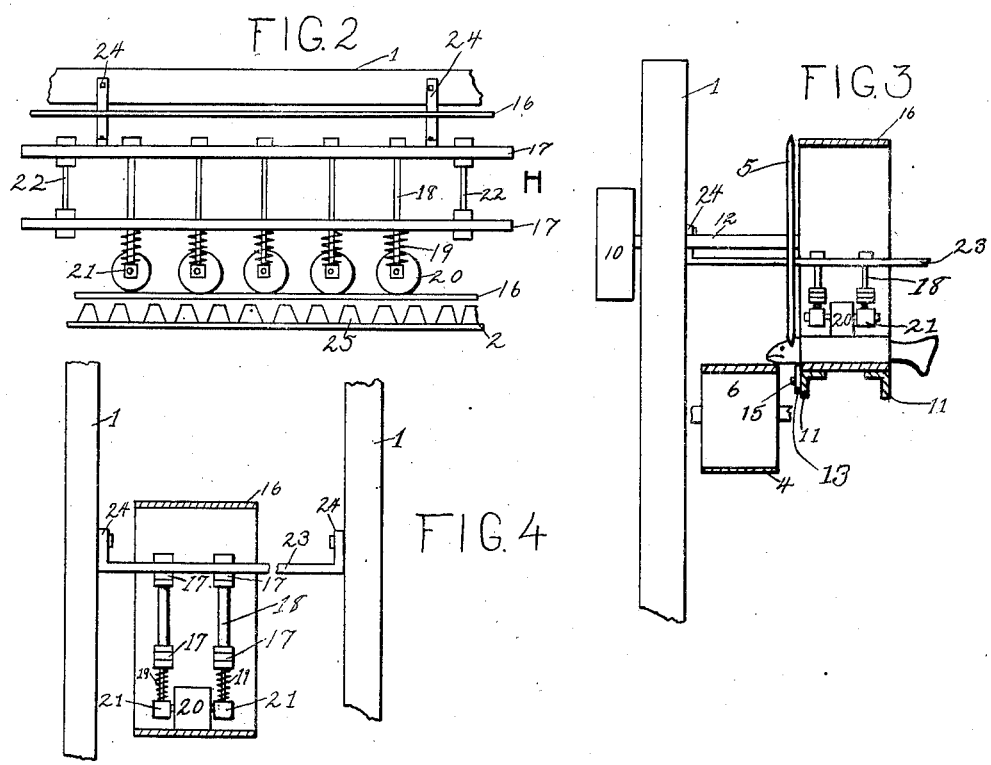
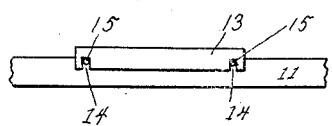
ANDREW L. CHRISTIANSEN
*INVENTOR.*
BY *Fred H Hayne*
*ATTORNEY.*

Patented May 26, 1925.

1,539,300

UNITED STATES PATENT OFFICE.

ANDREW L. CHRISTIANSEN, OF WILMINGTON, CALIFORNIA, ASSIGNOR OF TWENTY-FOUR PER CENT TO WILLIAM S. LA LONDE, OF LOS ANGELES, CALIFORNIA.

FISH CUTTING AND CLEANING MACHINE.

Application filed May 14, 1924. Serial No. 713,364.

*To all whom it may concern:*

Be it known that I, ANDREW L. CHRISTIANSEN, a subject of the King of Denmark, residing at Wilmington, in the county of Los Angeles and State of California, have invented a new and useful Fish Cutting and Cleaning Machine, of which the following is a specification.

My invention relates to fish cutting and cleaning machines, and is an improvement on the apparatus shown in my prior application, Serial Number 695,148, filed Feb. 26, 1924.

It has been found in practise that one of the members of my apparatus, which member serves to assist in holding the fish in position on the conveyor, does not function as adequately as was first thought. Said member serves well enough for the purpose intended, but it is found that the improvement hereinafter set forth functions much more efficiently. Moreover, it has been found expedient to provide an additional means for supporting the heads of the fish as they extend beyond the cleats of the conveyor and angle iron forming parts of the apparatus described in the above mentioned application. It has been found also that an adjustable knife, placed on the angle iron in proximity with my fan, forming part of my fish head and internal organ remover, will assist materially said fan in functioning properly.

It is therefore an object of the present invention to provide a means, adjustable in nature, for holding the fish on a conveyor so that they may with certainty be pushed under the cutter with which my apparatus is equipped, without said fish slipping or being crushed or bruised, or, indeed, fail to be cut; said means being also of such a nature that fish of varying sizes may be forced under said cutter.

It is also an object of my invention to provide such a means as just mentioned on both sides of the cutter and also in close proximity with the fish head and internal organ remover, which means insures that said remover will function properly and also that various sizes of fish may be accommodated.

A further object of my invention is to provide a fish head supporting means, which means is adapted to travel with and at approximately the same speed as the conveyor or fish carrying means of my apparatus.

It is also an object of my invention to provide a device capable of assisting the fish head and internal organ remover in functioning to remove expeditiously the heads and internal organs of the fish, said device being made adjustable so that it may be raised or lowered as required in practise.

More specifically, it is an object of my invention to provide a device consisting of a series of parallel bars, capable of being adjusted when placed in position on my apparatus, certain of said bars being equipped with means whereby they may be adjusted toward and away from each other. It is also my intention to provide a set of rollers adjustably mounted on certain of said bars and below certain of said bars, which rollers are adapted to be pressed against the fish holding means or belt used with my apparatus, springs being provided for this purpose.

It is also an object of my invention to provide a set of improvements on the apparatus disclosed in the hereinbefore mentioned apparatus, which are simple in form, inexpensive to manufacture, efficient in operation, and incapable of easily getting out of order.

Further objects of my invention as well as the advantages thereof will become apparent as the description thereof proceeds.

In the accompanying drawings, similar reference characters denote similar parts.

In the drawings,

Fig. 1 is a fragmentary side view of my apparatus with my improvements thereon, there being only sufficient mechanism shown to disclose how the apparatus is operated, Fig. 2 is a fragmentary side view, on a somewhat larger scale than that of Fig. 1, showing my fish holding and fish accommodating means or member, Fig. 3 is a sectional detail view showing the manner in which the heads of the fish are held, accommodated and cut, and also how said heads are held as the conveyor carries said fish to the fan, Fig. 4 is a fragmentary detail view showing how the fish holding and accommodating member is positioned inside the belt or fish holding member and how said member is secured in position on the frame of my apparatus, and Fig. 5 is a side view of the knife shown in position on one of the angle irons.

Describing my invention more in detail, 1 indicates the frame supporting my apparatus. Said frame supports a driving member or pulley 8 by means of which the cutter, conveyor, belt or fish holding member, fan and fish head supporting member are operated.

It has not been thought necessary to illustrate or describe in detail how said driving member 8 operates the various members or parts just mentioned, as the various details have been amply described in the application hereinbefore mentioned. It is thought sufficient to state that the shaft supporting the pulley over which the conveyor rides is also provided with another pulley 6, over which a belt 4 travels, which belt constitutes the fish head supporting member or means. Another pulley 7 is supported on the frame 1 at a suitable place, and constitutes the second pulley over which said belt travels, the speed of said belt being approximately that of the conveyor.

The fish holding and fish accommodating member is shown more clearly in Fig. 2, and is designated generally by means of the reference character H. Said member is positioned inside the belt or fish holding member 16, which member is adapted to hold the fish within the cleats 25 of the conveyor 2.

The fish holding and accommodating member H comprises a series of parallel bars 17, one pair being preferably placed above another and parallel thereto, the distance between each pair being made adjustable by means of devices such as the usual nut and bolt means 22.

Similar adjustable bolts 18 are mounted on the bars 17, as shown, and are adapted to coact with bearings 21 of the rollers 20, springs 19 being provided to press said rollers against the belt 16. By turning the heads of the bolts or manipulating the nuts the tension on said springs may be adjusted as desired. The upper pair of bars 17 are secured in place on the frame 1 by means of cross-bars 23, provided with flanges 24, which flanges may be adjustably secured to the frame in any manner found desirable. The cross-bars are bolted or otherwise secured to the bars 17, holding the same firmly in position on or inside the belt 16.

Preferably five rollers are provided, which rollers are placed in proximity to the fan 3 comprising with the angle iron 11 my fish head and internal organ remover. Said rollers, together with the springs against which they operate, provide a means by which fish of different sizes may be accommodated and yet form an additional means for holding said fish in position on the conveyor. Said member H therefore also forms an additional member or means for assisting the belt or fish holding member 16 in holding the fish in position on the conveyor and insures that each fish may be conveyed to said fan, and that in no case may any such fish be skipped, or bruised or crushed in any way. In this manner fish of varying size may be freely used on my machine with the assurance that they will be expeditiously cut and cleaned.

Similar members with rollers may be placed at various points along the conveyor, as may be found desirable. In the present case one roller is placed on each side of the cutter 5, though any number may be used as desired. Said rollers insure that each fish is forced under the cutter and also that fish of varying size may be cut and cleaned. Similar supporting means for said rollers may be provided for attaching them to the bars, and said bars in turn being secured to the frame 1 as shown.

It has also been found desirable to support the heads of the fish as said fish are conveyed along the machine. For this purpose the belt 4 is provided. This belt with its pulleys 6 and 7 form an admirable means for insuring that fish of large size may be cut and cleaned without being mutilated or crushed in the apparatus. The belt 4 travels at approximately the same speed as the conveyor and in the same direction.

It has also been found in practise that an adjustable knife 13, mounted on the angle iron 11, back of the fan 3, materially assists said fan in removing the heads and internal organs of the fish. Said knife 13 is provided with a pair of slots 15, which, together with the bolts 14 form a means whereby said knife may be raised or lowered as required. See Fig. 5.

The cutter 5 is driven by the pulley or driving member 8 by means of the belt 9, which in turn operates the pulley 10, mounted on the shaft 12 on which is also mounted the cutter 5.

The operation of the various parts should now be clear. Fish of various sizes are placed in parallel relation on the conveyor and between the cleats 25, and the driving member 8 set in motion. The rotary cutter 5 is rotated and the belt 16, conveyor 2 and belt 4 moved forwardly to the right of Fig. 1.

The rollers 20 permit the large-sized fish to raise said rollers, which at the same time hold said fish firmly in place and insure that the cutter 5 severs the back bones, the roller at the right of said cutter serving to hold the larger fish on the conveyor and between the cleats 25. The heads of the fish are supported on the belt 4 as shown in Fig. 3. Arriving at the fan 3, the fish are securely held in position on the conveyor, the rollers 20 riding up and down as the various sized fish are forced underneath. The sharp edge of the knife 13 materially assists said fan in removing the heads and internal organs of each fish as more clearly described in applicant's hereinbefore mentioned application.

It is obvious that my invention may be modified throughout a wide range; I therefore do not propose to limit myself to the exact details of construction described and illustrated, but reserve the right to make any changes that fall within the scope of the appended claims.

I claim as my invention:

1. In combination, a fish cutting and cleaning machine, a cutter for severing the back bones of fish, means for automatically bringing said fish into contact with said cutter, means for holding said fish in position on said first mentioned means, means whereby said second mentioned means may be made to accommodate and hold fish of different sizes, and means for automatically removing the heads and internal organs of said fish.

2. In combination, a fish cutting and cleaning machine, means for severing the back bones of fish, means for automatically bringing said fish into contact with said first mentioned means, means for holding said fish in position on said second mentioned means, means whereby said third mentioned means may be made to accommodate and hold fish of different sizes, a fish head and internal organ remover comprising two parts, and means on one of said parts whereby said fish head and internal organ remover may be assisted in removing the heads and internal organs from said fish.

3. In combination, a fish cutting and cleaning machine, means for severing the back bones of fish, means for automatically bringing said fish into contact with said first mentioned means, means for holding said fish in position on said second mentioned means, means whereby said third mentioned means may be made to accommodate and hold fish of different sizes, a fish head and internal organ remover comprising two parts, and an adjustable means on one of said parts whereby said fish head and internal organ remover may be assisted in removing the heads and internal organs from said fish.

4. In combination, a fish cutting and cleaning machine, a cutter for severing the back bones of fish, means for automatically bringing said fish into contact with said cutter, means for holding said fish in position on said first mentioned means, means for automatically removing the heads and internal organs from said fish, and means positioned on said second mentioned means and in proximity with said third mentioned means whereby different sizes of fish may be accommodated and held in position to be cut and cleaned.

5. In combination, a fish cutting and cleaning machine, a cutter for severing the back bones of fish, a conveyor for automatically bringing fish into contact with said cutter, a fish holding member adapted to coact with said conveyor to hold the fish in position thereon, a fish head and internal organ remover positioned in close proximity with said conveyor, a fish accommodating and holding member on said fish holding member and in proximity with said fish head and internal organ remover, said fish accommodating and holding member being adapted to accommodate and hold fish of different sizes, and means for supporting the heads of said fish as they travel along on said conveyor.

6. In combination, a fish cutting and cleaning machine, a cutter for severing the back bones of fish, a conveyor for automatically bringing said fish into contact with said cutter, a fish holding member adapted to coact with said conveyor for holding said fish in position thereon, means positioned on at least one side of said cutter for accommodating and holding fish of different sizes, and a fish head and internal organ remover positioned in close proximity with said conveyor for removing the heads and internal organs of said fish.

7. In combination, a fish cutting and cleaning machine, a cutter for severing the back bones of fish, a conveyor for automatically bringing said fish into contact with said cutter, a fish holding member adapted to coact with said conveyor for holding said fish in position thereon, means positioned on at least one side of said cutter for accommodating and holding fish of different sizes, a fish head and internal organ remover positioned in close proximity with said conveyor for removing the heads and internal organs of said fish, and additional means for holding and accommodating fish of different sizes positioned on said fish holding member and in proximity with said fish head and internal organ remover for accommodating and holding fish of different sizes.

8. In combination, a fish cutting and cleaning machine, a cutter for severing the back bones of fish, a conveyor for automatically bringing said fish into contact with said cutter, a fish holding member positioned in close proximity with said conveyor for holding said fish in position thereon, means positioned on said fish holding member and on at least one side of said cutter to accommodate and hold fish of different sizes, a fish head and internal organ remover for removing the heads and internal organs from said fish, additional means positioned on said fish holding member and in proximity with said fish head and internal organ remover for accommodating and holding fish of different sizes, and means travelling in close proximity with said conveyor for supporting the heads of the fish.

9. In combination, a fish cutting and cleaning machine, a cutter for severing the back bones of fish, a conveyor for automatically bringing said fish into contact with said cutter, a fish holding member for holding said fish in position on said conveyor, a fish head and internal organ remover for removing the heads and internal organs from said fish, and fish holding and accommodating means positioned at one or more points on said fish holding means, said fish holding and accommodating means being adapted to accommodate and hold fish of different sizes.

10. In combination, a fish cutting and cleaning machine, a cutter for severing the back bones of fish, a conveyor for automatically bringing said fish into contact with said cutter, a fish holding member adapted to coact with said conveyor for holding said fish thereon, a fish head and internal organ remover mounted in close proximity with said conveyor for removing the heads and internal organs from said fish, an angle iron mounted in close proximity with said conveyor, a knife on said angle iron, said knife being adapted to coact with said fish head and internal organ remover for assisting the latter in its operation, means positioned at various points on said fish holding member for accommodating and holding fish of different sizes, and a belt positioned in close proximity with said conveyor for supporting the heads of the fish.

11. In a fish holding and fish accommodating member, a pair of parallel bars, a pair of cross-bars secured to said first mentioned bars and provided with means for anchoring said bars in position, a second pair of parallel bars arranged in parallel relation with said first mentioned bars, means whereby the distance between said pairs of bars may be adjusted, a series of spring-controlled devices arranged parallel to said pairs of bars and below said bars, and adjustable means arranged on said pairs of bars whereby the height of said devices may be adjusted.

ANDREW L. CHRISTIANSEN.